Figure 1:
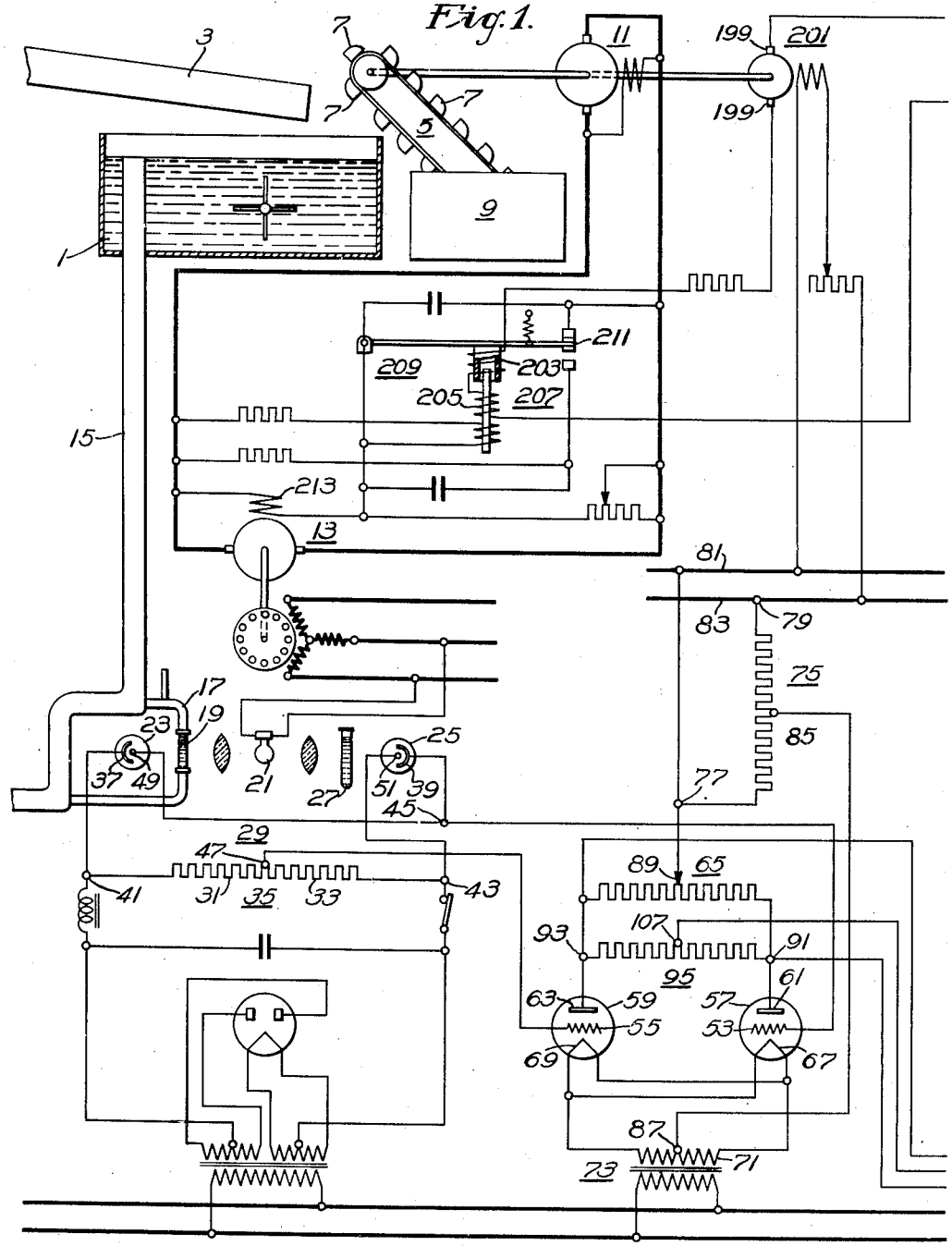

June 16, 1936.　　　　F. H. GULLIKSEN　　　　2,044,164
CONTROL APPARATUS
Filed Oct. 14, 1932　　　　2 Sheets-Sheet 1

WITNESSES:
P. J. Fitzgerald
Hymen Diamond

INVENTOR
Finn H. Gulliksen.
BY F. W. Leyle.
ATTORNEY

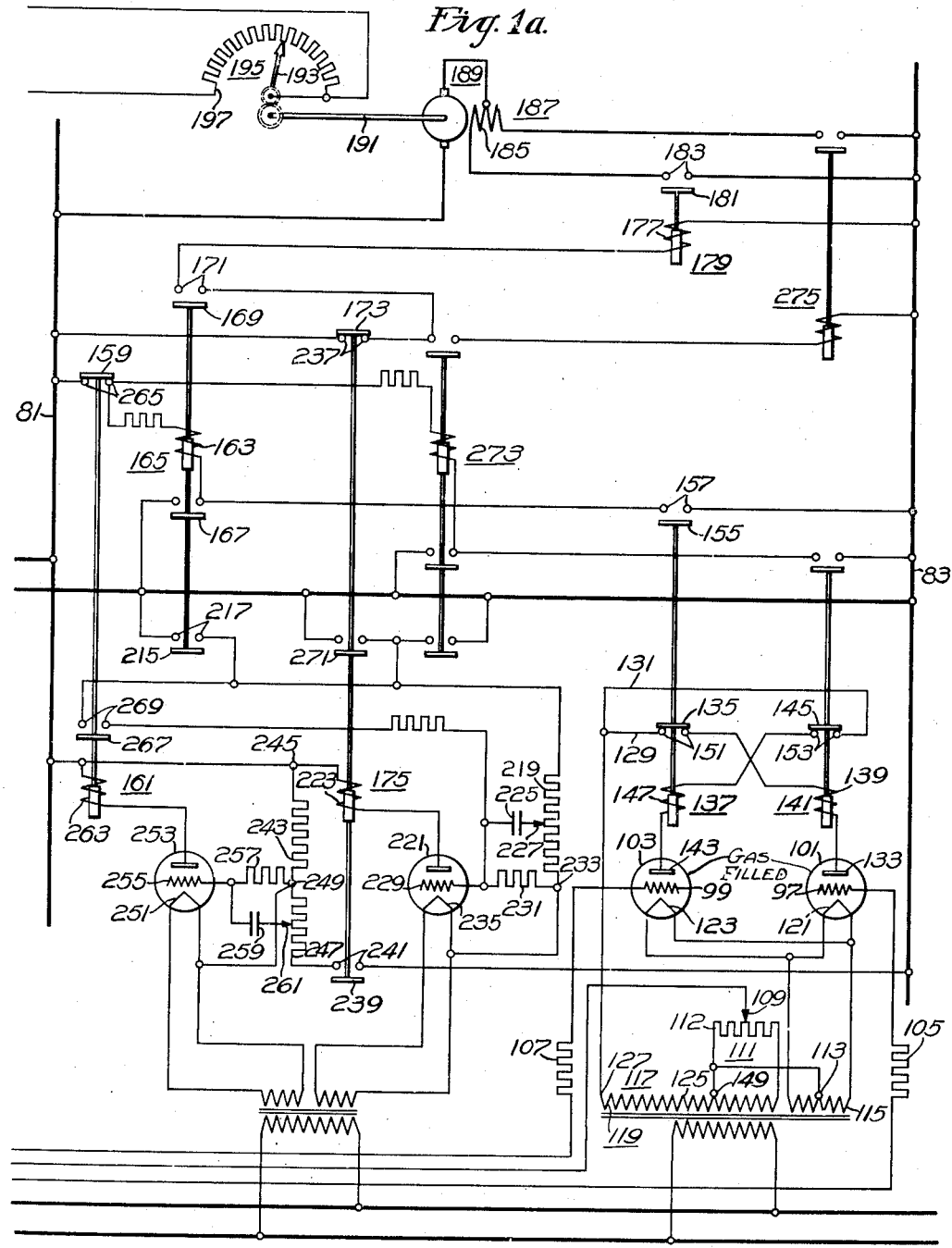

Patented June 16, 1936

2,044,164

UNITED STATES PATENT OFFICE 2,044,164

CONTROL APPARATUS

Finn H. Gulliksen, Wilkinsburg, Pa., assignor to Westinghouse Electric & Manufacturing Company, East Pittsburgh, Pa., a corporation of Pennsylvania Application October 14, 1932, Serial No. 637,771

8 Claims. (Cl. 250—41.5)

My invention relates to control apparatus and has particular relation to apparatus for controlling the relative amount or the rate of deposit of a constituent in a work substance.

It is an object of my invention to provide apparatus for so controlling the relative amount of a constituent in a work substance that it shall be maintained at a predetermined value and shall not vary alternately in a positive and negative sense from the predetermined value.

Another object of my invention is to provide apparatus for maintaining the relative amount of a constituent in a work substance at a predetermined value in which certain elements of a type that shall repress the tendency of the relative amount of the constituent to vary in a positive sense and in a negative sense about the predetermined value.

A further object of my invention is to provide apparatus for controlling the relative amount of a constituent in a work substance, by the operation of which a compensating variation in the relative amount of said constituent shall be introduced when a variation from a predetermined value is detected and after the compensating variation is introduced a predetermined interval of time shall elapse before the compensating elements of the apparatus are again responsive to the detecting elements to introduce a further compensating variation.

An incidental object of my invention is to provide a novel system for selectively amplifying the output of a normally balanced network when it is in unbalanced condition in accordance with the polarity of the unbalance of the network.

A further incidental object of my invention is to provide a simple electrical circuit for delaying the actuation of a switch a predetermined interval of time after an initial impulse has been received.

A further incidental object of my invention is to provide a system for timing the happening of a plurality of successive events that are automatically to take place after the happening of a predetermined event.

More concisely stated, it is an object of my invention to provide a system for accurately and with certainty controlling the relative amount of a constituent in a work substance.

In accordance with my invention a photo-sensitive device is subjected to the influence of a properly treated sample of the work substance, the condition of which is to be regulated. A second photo-sensitive device is subjected to the influence of a standard which corresponds to the condition at which the work substance is to be maintained. When the condition of the work substance with regard to the particular constituent which is being controlled varies from the desired normal value, the change thus produced in the two-photo-sensitive devices is properly amplified and the output of the amplifier is fed through the exciting coil of a relay of proper character which initiates the compensating operation.

In practice, my invention is generally applied to a system in which a constituent is deposited in a container at a predetermined rate, together with the other elements of the work substance. To control the relative amount of the constituent its rate of deposit is varied. Thus, my invention has proved of considerable utility in the processing of copper ore. In one step of the treatment of the ore lime, copper ore and water are continuously deposited in a container, the lime lending certain alkalinity to the mixture deposited. My invention has been applied to control the alkalinity of the mixture, and, in accordance with my invention, the rate of deposit of the lime is varied to accomplish this purpose.

Accordingly, if, in the above described detecting operation a variation in the relative amount of the constituent is detected, the excitation of the initiating relay causes the control elements of the system to be operated and to vary the amount of the constituent deposited. By the operation of the initiating relay, the rate of deposit of the constituent is varied by a predetermined amount, and after the rate has attained the new value, the variation in the rate is discontinued. The constituent is now deposited in the container at the new rate and accordingly the condition of the work substance should be changed with regard to the constituent.

However, when the constituent is first deposited at the new rate, the change does not at once take effect as far as the detecting apparatus is concerned. An interval of time must of necessity elapse between the change and the transmission of the change to the sample, that influences the photo-sensitive device. For this reason, the apparatus whereby the rate of deposit of the constituent is varied and the detecting apparatus are uncoupled from each other for a predetermined interval of time after the change in the rate of deposit has been produced and the latter has no influence on the operation of the former. After this interval of time has elapsed, the two elements are again coupled together and the rate-varying equipment is again subjected to the influences of the photo-sensitive devices which, in turn, respond to any variations in the character of the work substance.

It is seen that by thus delaying the influence of the detecting system on the compensating system the compensating system is prevented from overshooting in its compensating effect and the relative amount of the constituent in the work substance is maintained at a comparatively constant value.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawings, in which Fig. 1 and Fig. 1a constitute a complete diagrammatic view showing an embodiment of my invention.

As has been mentioned hereinabove, my invention has been applied with particular success in the copper refining industry in which it is utilized for the purpose of maintaining the alkalinity of a fluid comprising copper ore, water and lime at a predetermined alkalinity. The apparatus shown in the single figure comprises a tank 1 into which a fluid comprising copper ore and water is fed through an outlet 3 and into which lime is fed by a cup conveyor 5. The cups 7 of the conveyor 5 dip into a tank 9 containing lime, are advanced to a point above the tank 1 containing the copper ore and water and there deposit the lime into this mixture.

The conveyor 5 is motivated by a motor 11 which in turn is energized from a generating system 13. The output of the generating system 13 and consequently the speed of the motor 11 is controlled from a system of relays, the operation of which is dependent on the variation in the alkalinity of the fluid. If when a charge occurs the generating system 13 is so modified that the speed of the motor 11 increases, the lime is deposited at a greater rate than before the change has occurred and the alkalinity is correspondingly increased. On the other hand, if the generator is so modified that the speed of the motor is decreased, the alkalinity of the system is correspondingly decreased.

The mixture comprising the lime, copper and water which is deposited in the tank 1 is, after being well stirred, removed from the tank 1 to another tank (not shown) for further treatment through a tube 15 which projects into the tank 1. The tube is equipped with a by-pass pipe 17 through which a small portion of the fluid is removed. This portion of the fluid after being properly filtered and treated with a re-agent, such as phenolthalein, is projected through a transparent tube 19.

The transparent tube 19 is disposed in the path of a radiant beam emanating from a source 21 and the resultant beam transmitted through the tube 19 impinges on a photo-sensitive device 23. A second photo-sensitive device 25 is energized by radiations from the source 21 that are transmitted through a filter 27 which is of such color and character, as to influence the photo-sensitive device 25 in a manner corresponding to that in which it would be influenced by a test sample of the proper alkalinity.

The photo-sensitive devices 23 and 25 comprise the adjacent arms of a balanced network 29 of the type similar to a Wheatstone bridge. The other arms of the network 29 are properly subdivided portions 31 and 33 of a resistor 35 which is connected between the cathodes 37 and 39 of photo-sensitive devices 23 and 25. Potential is applied between the junction points 41 and 43 of the resistor 35 and the cathodes 37 and 39 from a suitable power source, the output of which is rectified and suitably filtered.

The output terminals 45 and 47 of the bridge comprising the junction points of the anodes 49 and the cathode 39 of the photo-sensitive devices 23 and 25 respectively and the other tap of the resistor 35 are connected respectively to the control electrodes 53 and 55 of a plurality of high vacuum electric-discharge devices 57 and 59. The anodes 61 and 63 of the devices 57 and 59 are connected to each other through a variable tap potentiometer 65. The cathodes 67 and 69 of the devices 57 and 59 are energized from the secondary 71 of a common transformer 73 and are therefore substantially at a common potential. Plate potential is supplied to the electric discharge devices 57 and 59 from potentiometer 75, the terminals 77 and 79 of which are connected to the bus lines 81 and 83 of a direct current power supply source (not shown). The mid-tap 85 of the potentiometer 75 is connected to the center tap 87 of the secondary 71 of the transformer 73 whereby the cathodes 67 and 69 of the electric-discharge devices 57 and 59 are energized while its lower terminal tap 77 is connected to the movable tap 89 of the potentiometer 65 that is coupled between the anodes 61 and 63 of the electric discharge devices.

When the alkalinity of the system varies from the predetermined value at which it is desirable that it be maintained, the balance of the network 29 in which the photo-sensitive devices 23 and 25 are connected is disturbed and a potential, the polarity of which is dependent on the polarity of the variation of the alkalinity, is impressed across the output terminals 45 and 47 of the bridge and, therefore, between the control electrodes 53 and 55 of the electric-discharge devices 57 and 59. Since the control electrodes 53 and 55 of the electric-discharge devices 57 and 59 are connected to the cathodes 67 and 69 by the space current traversing the electric-discharge devices and since the cathodes 67 and 69 are substantially at a common potential, the potential of one control electrode 53 or 55 will be greater relative to its corresponding cathode 67 or 69 than the potential of the other control electrode relative to its cathode. A current of resultant magnitude and polarity, predetermined by the particular electric discharge device 57 or 59, the control electrode of which is at a greater potential relative to its cathode, will therefore be transmitted through the potentiometer 65 that is connected between the anodes 61 and 63 of the electric-discharge devices 57 and 59 and a drop in potential of polarity and a magnitude predetermined by the magnitude and direction of the current, will be impressed across the terminals 91 and 93 of a resistor 95 that is coupled between the anodes 61 and 63 of the electric-discharge devices 57 and 59 in parallel with the potentiometer 65.

The terminals 91 and 93 of the resistor 95 are connected respectively to the control electrodes 97 and 99 of a plurality of gas-filled electric-discharge devices 101 and 103 through a plurality of suitable grid resistors 105 and 107. The resistor 95 is moreover provided with a center tap 107 which is connected to the movable tap 109 of another potentiometer. One terminal 112 of the potentiometer 111 is in turn connected to the center tap 113 of a section 115 of the secondary 117 of a transformer 119 whereby power is supplied to the gas-filled electric-discharge devices 101 and 103. The gas-filled devices are preferably of the hot cathode type and the section 115 of the secondary 117, to the center tap 113 of which the terminal 112 of the potentiometer 111 is connected, is utilized for the purpose of energizing their cathodes 121 and 123.

The potentiometer 111 is moreover connected across a portion of the windings of another section 125 of the secondary 117 of the transformer 119 and is thus energized. To one terminal 127 of the last-named section 125 of the secondary 117 a plurality of conductors 129 and 131 are connected. One conductor 129 is connected to the anode 133 of one electric discharge device 101 through a movable contactor 135 of a relay 137 and the exciting coil 139 of another relay 141 while the other conductor 131 is connected to the anode 143 of the other electric discharge device 103 through a movable contactor 145 of the last-named relay 141 and through the exciting coil 147 of the first-named relay 137. Since an intermediate tap 149 of the section 125 of the secondary 117 is connected substantially to the cathodes 121 and 123 of both electric discharge devices 101 and 103, the relays 137 and 141 are energized respectively through the electric discharge devices 103 and 101 and through the movable contactors 145 and 135. The relays 137 and 141 are therefore interlocked and when one electric discharge device is energized the other must necessarily be deenergized.

Each of the gas filled electric-discharge devices 101 and 103 is of the type having an energized condition and a deenergized condition and is capable only of abrupt transition from one condition to the other. The condition in which an electric-discharge device of this type is at any particular time, is dependent on the potentials impressed between its control electrode and its principal electrodes and between its principal electrodes. If, while the device is in a deenergized condition, the potential of the control electrode is so varied that it becomes energized, the device remains energized until the potential between the principal electrode is reduced to a value below the ionizing potential of the gas in the electric-discharge device regardless of further variations in the control potential.

In the present instance, both electric discharge devices 101 and 103 are maintained normally deenergized and when a potential impulse of proper magnitude is transmitted from the high vacuum electric-discharge devices 57 and 59 and is impressed between the control electrodes 97 and 99 and the cathodes 121 and 123, one gas-filled electric-discharge device 101 or 103, depending on the polarity of the impulse that is transmitted, is energized and a current is transmitted through the exciting coil 139 or 147 of the corresponding relay 141 or 137. The magnitude of the potential impulse for which either of the electric discharge devices 101 or 103 becomes energized is regulated by the potentiometer 111 that is connected to the cathodes 121 and 123 of the electric discharge devices.

The relay 137 or 141 is, therefore, energized and its movable contactor 135 or 145, which is in series with the plate circuit of the other electric-discharge device 101 or 103 is disconnected from its corresponding fixed contacts 151 or 153 and thus prevents the other electric-discharge device 103 or 101 from becoming energized by reason of any transient effects which might be produced by drainage or the supply of power from or to any part of the system.

For purposes of simplifying the explanation, let it be assumed that one of the electric discharge devices 103 and its corresponding relay 137 is energized. The upper movable contactor 155 of the relay 137 engages a plurality of corresponding fixed contacts 157 and a circuit is closed through the movable contactor 159 of a third relay 161 and through the exciting coil 163 of a 4th relay 165. The 4th relay 165 is locked in its energized condition through its central movable contact 167 and its upper movable contactor 169 engages a plurality of corresponding fixed contacts 171 to close a circuit through the movable contactor 173 of a 5th relay 175 and through the exciting coil 177 of a 6th relay 179.

The latter relay 179 being now energized, its movable contactor 181 engages a plurality of fixed contacts 183 to close a circuit through a portion 185 of the windings 187 of a split-winding motor 189, thus energizing the motor to rotate in one direction. The shaft 191 of the motor 189 is coupled to the movable contactor 193 of a rheostat 195. The movable contactor 193 and a fixed terminal 197 of the rheostat 195 are connected to the output terminals 199 of a pilot generator 201 energized from the motor 11 whereby the cup conveyor 5 is driven and through the exciting coils 203 and 205 of the controlling relay 207 of the regulator 209 whereby the output of the power supply generator 13 is regulated. As the excitation of the controlling relay 207 is varied by the variation in the rheostat 195, the movable contactor 211 of the relay is displaced in accordance with the variations, and the output of the generator 13 is accordingly varied. The movable contactor 211 has three possible positions and the impedance which is shunted across or serially connected to the exciting coil 213 of the generator 13 is dependent on the position of the movable contactor 211.

As the output of the generator 13 is varied, the speed of the motor 11 whereby the cup conveyor 5 is motivated is varied and the deposit of lime in the mixture of copper ore, water and lime is varied to correspond to the indication of the photo-sensitive system.

To return now to the relay system, it is noted that the 4th relay 163 is in energized condition and that consequently its lower movable contactor 215 is in engagement with its corresponding fixed contacts 217. A circuit is, therefore, closed through contactor 215, a potentiometer 219, the plate circuit of an electric-discharge device 221 of the high vacuum type and the exciting coil 223 of the 5th relay 175. A capacitor 225 is connected between the movable tap 227 of the last-mentioned potentiometer 219 and the control electrode 229 of the electric-discharge device 221 and a suitable resistor 231 is connected between the lower terminal 233 of the potentiometer 219 and the control electrode.

When the lower movable contactor 215 of the 4th relay engages its corresponding fixed contacts 217, a small current is transmitted through the electric discharge device 221 which is, however, insufficient to energize the 5th relay 175. On the other hand, the capacitor 225 in the control circuit of the electric-discharge device 221 is charged by the small current through the resistor 231 and through the potentiometer 219 and, as long as the charging current flows through the resistor 231, the control electrode 229 is maintained at a potential that is negative with respect to the cathode 235. The output of the electric-discharge device 221, therefore, increases at a rate dependent on the relative magnitudes of the capacitor 225 and the resistor 231 and finally attains a value that is sufficient for the excitation of the 5th relay 175. In practice, I have found that the 5th relay 175 should preferably be energized, approximately one-half second after the 4th relay 165 is energized.

When the 5th relay becomes energized, its upper movable contactor 173 is disengaged from its corresponding fixed contacts 237 and the circuit through the 6th relay 179 is opened. The latter relay drops out and, accordingly, the motor 189 whereby the rheostat 195 in the pilot generator circuit is varied is deenergized. At this time, a variation of predetermined magnitude has been applied to the generator 13 whereby the driving motor 11 is energized and the lime is being deposited in the ore mixture at a rate corresponding to the latest speed of the motor.

However, since a considerable interval of time must elapse before the effect of the variation in the speed is transmitted to the test sample in the tube 19, I have found it advisable to prevent the operation of the compensating system for a predetermined interval of time which, in practice, is of the order of five minutes. This object is accomplished by utilizing a second time delay relay of the thermionic type.

When the 5th relay 175 is energized, its lower movable contactor 239 engages a plurality of fixed contacts 241 and a circuit is closed through a potentiometer 243. The terminal taps 245 and 247 of the potentiometer 243 are connected to the bus lines 81 and 83 of the power source while its central tap 249 is connected to the cathode 251 of a high vacuum electric-discharge device 253. It is also connected to the control electrode 255 of the high vacuum device 253 through a resistor 257. A capacitor 259 is connected between the control electrode 255 of the device 253 and a movable tap 261 of the potentiometer 243.

The electric-discharge device 253 is normally in deenergized condition but when the lower movable contactor 239 of the 5th relay engages its corresponding fixed contacts 241, its principal circuit is closed. At the same time, a charging current is transmitted through the resistor 257 to the capacitor 259 and a drop in potential is, therefore, impressed between the cathode 251 of the electric-discharge device 253 and its control electrode 255. The output of the electric-discharge device 253 is, therefore, maintained at a lower level for an interval of time determined by the relative magnitudes of the resistor 257 and the capacitor 259 in its control circuit. After this interval of time has elapsed, a comparatively large current is transmitted through the electric-discharge device 253 and through the exciting coil 263 of the third relay 161, which is in series with its plate circuit.

When the third relay 161 is energized, its upper movable contactor 159 becomes disengaged from a plurality of corresponding fixed contacts 265, the lock-in circuit through the 4th relay 165 is opened and the 4th relay is deenergized. At the same time, the lower movable contactor 267 of the 3rd relay 161 engages a plurality of corresponding fixed contacts 269 and a circuit is closed through the central movable contactor 271 of the 5th relay, the lower movable contactor 267 of the 3rd relay, the time-delay circuit associated with the first-mentioned time delay system, and the exciting coil 223 of the 5th relay 175. It is to be noted that the central movable contactor 271 of the 5th relay 175 has replaced the lower movable contactor 215 of the 4th relay 165 in maintaining the above-described circuit closed for the reason that the 4th relay was deenergized when the third relay 161 was energized. The connections between the capacitor 225 and the terminals 81 and 83 of the power source whereby it was charged are now reversed and the capacitor is quickly discharged and recharged to the opposite polarity. The excitation of the electric-discharge device 221 associated with the first-mentioned time delay system is, therefore, reduced substantially to zero and the 5th relay 175 is deenergized reverting the whole system to its initial condition and rendering the compensating elements responsive to the output of the balanced network.

It is to be noted that if the response of the balanced network 29 had been such that the other interlocked relay 141 had been energized instead of the relay 137, the same series of steps would have been repeated with the 4th and 6th relays 165 and 179 replaced by two relays 273 and 275 so connected to the system as to cause the control motor 189 to rotate in the opposite direction and the rate of deposit of lime to be varied in the opposite sense.

While my invention has been shown herein as applied to a particular system, it is apparent that it should not be restricted in its scope to such a system. As is apparent from a consideration of the invention, it can be applied in any contingency where it is desirable that the relative amount of a constituent in a work substance be maintained at a predetermined value or between predetermined limits. Thus, my invention may be applied with advantage in water treatment to maintain the percentage of chlorine in the water at a predetermined value. It may also be applied in numerous other fields which could be named with facility.

Moreover, it is well to keep in mind that the specific elements and circuits utilized in certain parts of this system, as it is shown, may be replaced by other elements when any necessity therefor arises. Thus, the high vacuum electric-discharge devices 221 and 253 in the time delay systems may be replaced by gas-filled devices or mercury-pool devices. Also, the hot cathode gas-filled devices 101 and 103 that are connected through the exciting coils 139 and 147 of the interlocked relays 141 and 137 may be replaced by mercury pool devices of similar nature. In certain systems it may also be possible to eliminate one of the groups of amplifying electric discharge devices.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A system for controlling the relative amount of a constituent in a work substance comprising means to respond to variations in the relative amount of said constituent in said work substance, means, to be actuated by said responsive means when the relative amount of said constituent varies from a predetermined value, for applying a compensating variation in the relative amount of said constituent, the last said means being locked in in its operative condition and being operative after its actuation irrespective of the condition of its actuating means, means, other than said locked-in means, for interrupting the application of said compensating variation after a predetermined interval of time and means, other than said locked-in means, to be actuated by said interrupting means, for preventing the application of another compensating variation until a second interval of time has elapsed to provide for the proper influence of said first-named compensating variation on said responsive means.

2. A system for controlling the relative amount of a constituent in a work substance comprising means to respond to variations in the relative amount of said constituent in said works substance, means, to be actuated by said responsive means when the relative amount of said constituent varies from a predetermined value, for applying a compensating variation in the relative amount of said constituent, the last said means being locked in in its operative condition and being operative after its actuation, irrespective of the condition of its actuating means, means, other than said locked-in means, for interrupting the application of said compensating variation after a predetermined interval of time and means, other than said locked-in means, to be actuated by said interrupting means after said interval of time for reverting said means for applying a compensating variation to a condition such that it is again responsive to said responsive means only after a second interval of time has elapsed thereby to provide for the proper influence of said first-named compensating variation on said responsive means.

3. A system for controlling the relative amount of a constituent in a work substance comprising means to respond to variations in the relative amount of said constituent in said work substance, means, to be actuated by said responsive means when the relative amount of said constituent varies from a predetermined value, for applying a compensating variation in the relative amount of said constituent, the last said means being locked in in its operative condition and being operative after its actuation, irrespective of the condition of its actuating means, means, other than said locked-in means, for interrupting the application of said compensating variation after a predetermined interval of time and means, other than said locked-in means, for both reverting said means for applying a compensating variation to its initial condition and reverting said interrupting means to a condition such that it is again responsive to said responsive means only after a second interval of time has elapsed thereby to provide for the proper influence of said first-named compensating variation on said responsive means.

4. A timing system comprising an electric discharge device, a timing circuit to cooperate therewith, means for applying power to said timing circuit and said electric discharge to increase the excitation of said electric discharge device at a rate predetermined by said timing circuit, another electric discharge device, a timing circuit to cooperate therewith, means to be actuated by the output of said first-named electric discharge device when said output attains a maximum value for increasing the excitation of said last-named electric discharge device at a rate predetermined by said timing circuit and means to be actuated by said last-named electric discharge device when it attains its maximum excitation for reverting the excitation of said first-named electric discharge device to its initial condition.

5. A timing system comprising an electric discharge device, a timing circuit to cooperate therewith, means for applying power to said timing circuit and said electric discharge to increase the excitation of said electric discharge device at a rate predetermined by said timing circuit, another electric discharge device, a timing circuit to cooperate therewith, means to be actuated by the output of said first-named electric discharge device when said output attains a maximum value for increasing the excitation of said last-named electric discharge device at a rate predetermined by said timing circuit and means to be actuated by said last-named electric discharge device when it attains its maximum excitation for reverting the excitation of said first-named electric discharge device to its initial condition and for reverting said last-named electric discharge device to its initial condition.

6. Apparatus for controlling the relative amount of a constituent in a work substance comprising means to respond to variations in the relative amount of said constituent, means, to be actuated by said responsive means when the relative value for said constituent varies from a predetermined value, for applying a compensating variation, means, including an electric discharge device, a timing circuit to cooperate therewith and means to cooperate with the compensating means to increase the excitation of said electric-discharge device at a rate determined by said timing circuit, for interrupting the application of said compensating variation and means, including another electric discharge device, a time circuit to cooperate therewith and means to cooperate with said interrupting means to increase the excitation of said last-named electric discharge device at a rate predetermined by said last-named timing circuit, for reverting said means for applying a compensating variation to a condition such that it is responsive to said variation-responsive means and for decreasing the excitation of said first-named and said last-named electric discharge devices to their initial conditions.

7. A timing circuit comprising an electric discharge device having a control electrode and a plurality of principal electrodes, a network comprising a resistor and a capacitor coupled between said control electrode and one of said principal electrodes and means for energizing said electric discharge device to transmit a current for charging said capacitor through said resistor thereby to maintain a drop in potential across said capacitor and a resultant drop in potential between said principal electrode and said control electrode and to maintain the output of said device below a predetermined value until said capacitor has been charged.

8. In combination with an electrical discharge device of a type having a substantially unidirectional electrical conductivity and comprising an anode and a cathode and a control-electrode, a source of current supply for said device, a connection from one side of said source to said anode, an impedance coupled between said cathode and said control-electrode, an impedance connected between said cathode to the other side of said source, and a capacitor connected between said control electrode and the last-mentioned impedance.

FINN H. GULLIKSEN.